United States Patent [19]
Johnson et al.

[11] Patent Number: 6,156,699
[45] Date of Patent: Dec. 5, 2000

[54] PROCESS FOR THE PRODUCTION OF COATED, SINGULATED SEED

[75] Inventors: Kent Lynn Johnson, Modesto; John Francis Walsh, Linden, both of Calif.

[73] Assignee: Rhone-Poulenc AG Company Inc., Research Triangle Park, N.C.

[21] Appl. No.: 09/189,940

[22] Filed: Nov. 12, 1998

Related U.S. Application Data

[60] Provisional application No. 60/065,531, Nov. 13, 1997.

[51] Int. Cl.[7] ............................................. A01N 25/26
[52] U.S. Cl. ............................. 504/100; 47/57.6; 427/4
[58] Field of Search ........................ 504/100; 47/57.6; 427/4

[56] References Cited

U.S. PATENT DOCUMENTS

| | | | |
|---|---|---|---|
| 2,502,809 | 4/1950 | Vogelsang | 47/58 |
| 5,087,475 | 2/1992 | Bazin et al. | 427/4 |
| 5,106,648 | 4/1992 | Williams | 427/3 |
| 5,389,399 | 2/1995 | Bazin et al. | 427/212 |
| 5,401,534 | 3/1995 | Bourreau et al. | 427/212 |
| 5,520,457 | 5/1996 | Gontero et al. | 366/228 |
| 5,849,320 | 12/1998 | Turnblad et al. | 424/410 |

*Primary Examiner*—S. Mark Clardy
*Attorney, Agent, or Firm*—Burns, Doane, Swecker & Mathis, L.L.P.

[57] ABSTRACT

A process for coating seed which comprises applying a mixture comprising a particulate solid and a binder; then a singulating substance; then drying the seed to a point wherein the seeds are substantially separated one from another. Also a coated seed wherein the coating comprises a first layer which comprises a binder and a particulate solid, a second layer which comprises a singulating substance, and a third layer which comprises at least one member selected from the group consisting of a biological material and a phytoprotection product.

41 Claims, No Drawings

PROCESS FOR THE PRODUCTION OF COATED, SINGULATED SEED

CROSS-REFERENCE TO RELATED APPLICATION

This application claims the priority of copending U.S. Provisional Patent Application Ser. No. 60/065,531, filed Nov. 13, 1997, incorporated by reference herein in its entirety and relied upon.

BACKGROUND OF THE INVENTION

1. Technical Field of the Invention

The present invention relates to a new process for the production of coated, singulated seed as well as a new coated seed.

2. Description of the Prior Art

It is a problem in the preparation of large amounts of seed for crop production to treat seed uniformly. A way to prepare seed for storage and for its anticipated planting is to coat the seed with, among other things, a polymer to help ensure that the seed retains its viability and establishes a healthy plant. However, in the processes known for this type of production, the polymer must be applied to the seed using a carrier. Generally the carrier is a water-based carrier. As the carrier is drying, the seed may conglomerate into a sticky mass which causes the seed to be generally inseparable one from another and can compromise the effectiveness of the seed coating on individual seeds. Existing technology has generally been unable to provide adequate solutions to this problem for continuous processes for treating seed.

OBJECTS AND SUMMARY OF THE INVENTION

It is an object of the present invention to provide an improved continuous process for the coating of seeds.

Another object of the present invention is to provide an improved process for the production of large quantities of seed which are substantially separated one from another.

These objects are met in whole or in part by the present invention.

The present invention provides a process for coating seed which comprises:

(a) in a first step, applying to the seed a wet composition comprising a particulate solid and a binder to produce a wet mixture comprising solid, binder and seeds;

(b) in a second step, contacting the mixture with a singulating substance to produce individually separated seeds each of which is coated with binder, solid and singulating substance;

(c) in a third step, drying the singulated seeds.

Preferably, the process of the instant invention further comprises:

(d) in a fourth step, coating the seed with a mixture comprising a binder.

DETAILED DESCRIPTION OF THE INVENTION AND PREFERRED EMBODIMENTS

In the first step, the seed is preferentially substantially completely coated by the composition. The seed is also preferentially substantially completely coated by the singulating substance.

Even more preferably, after the third step the process may further comprise treating the seed with a biological material and/or a phytoprotection product.

Preferably the seed treated by the process of the instant invention is alfalfa seed.

The binder generally comprises a wettable solid. The solid may also be a hygroscopic solid. The binder is generally substantially suspendable in water, even more preferably substantially soluble in water. Most preferably the binder comprises a polymer or more than one polymer, preferably which can be suspended in water, even more preferably substantially soluble in water. The polymers that may be used in the present invention include polyvinyl alcohol, polysaccharides, cellulose, or a polymer comprising a cellulose derivative such as methyl cellulose, carboxymethyl cellulose, and hydroxypropyl methyl cellulose. Most preferably the binder of the instant invention comprises polyvinyl alcohol and a polysaccharide.

The particulate solid is preferably generally inert to the seed. By the term "inert" is meant that the solid does not substantially chemically change the content of the seed hull or germ plasm. Preferred particulate solids include calcium carbonate, clay, cellulose, wood flour, vermiculite and gypsum (also known as hydrated calcium sulfate). A preferred particulate solid does not substantially dissolve in water. By the term "not substantially dissolve in water" is meant that the solid has a solubility in water of less than 0.01 gram per 100 mL of water at 25° C.

Most preferably the composition is applied as a spray on the seed which is being treated or coated. The composition is generally a suspension of the binder and the solid in a carrier, preferably water. The composition may also comprise one or more of the following components: a surfactant, a dispersant, a suspension agent or an anti-foaming agent. Most preferably the composition comprises a dye in order to determine the coverage of the mixture on the seed. The weight percentage of the composition of the combination of the surfactant, dispersant, suspension agent and anti-foaming agent is generally from 0.1% to 10%, preferably from 0.5% to 5%, and most preferably from 0.5% to 2%. Percentages provided in this specification are by weight unless otherwise specified.

Generally the composition comprises from 1% to 10% of binder, preferably from 2% to 7%, most preferably from 3% to 5%. Generally the composition comprises from 10% to 50% of carrier, preferably from 20% to 40%, most preferably from 25% to 35%. Generally the composition comprises from 40% to 80% of particulate solid, preferably from 60% to 70%.

The wet mixture resulting from the treatment of the seed by the wet composition is generally a mass of seeds that substantially adhere one to another.

By the term singulating substance is meant a substance which assists the seeds in separating one from another while the seeds are substantially wet. The singulating substance generally does not dissolve in water. It is generally applied as a solid poured on or sprinkled on the seed. Preferably the singulating substance is a particulate solid, and more preferably has a mean particle size smaller than that of the seeds.

The singulating substance may be a dry solid, that is, a water-absorbing material which upon contact with a wet seed forms a barrier layer to prevent one sticky or tacky seed from adhering to another seed. Examples of dry solids include sodium sulfate, magnesium sulfate, calcium sulfate, calcium carbonate, or sodium carbonate.

In the second step, by the term "individually separated seeds" is meant that the seeds may tumble one over the other when rolled together in a collection. This term may distinguish the seeds from the seeds in a wet mixture with the binder and solid. Generally the seeds, when treated with the singulating substance, lose the ability to stick one to another.

The singulating substance may also comprise a material derived from a plant source, for example, powdered corn husks, sawdust, wood flour and the like.

Preferably the singulating substance comprises silicon dioxide. Singulating substances most preferably used in the invention include sand, silica and silica gel. The commercial material Cab-O-Sil may also be used in the invention.

The third step is generally effected by use of an air stream, preferably a heated air stream, blown on the seeds. The drying may also be by means of radiant heat or any equivalent means known to the skilled addressee. Generally the third step is completed when the seeds substantially freely tumble one over another and may be further processed or bagged for transport or storage. Such a third step generally reduces seed spoilage in storage.

The biological material generally comprises a bacteria, for example, Rhizobium spp., Azospirillum spp., Beauveria spp. or Pseudomonas spp. or a fungus, for example, Trichoderma spp. The biological material may optionally comprise a carrier, such as water. The phytoprotection product generally comprises a fungicide, insecticide, micronutrient, macronutrient or plant growth regulator.

In the fourth step, the mixture generally comprises a binder. The binder generally comprises a wettable solid. The solid may also be a hygroscopic solid. The binder is generally substantially suspendable in water, even more preferably substantially soluble in water. Most preferably the binder comprises a polymer or more than one polymer, preferably which can be suspended in water, even more preferably substantially soluble in water. The polymers that may be used in the present invention include polyvinyl alcohol, polysaccharides, cellulose, or a polymer comprising a cellulose derivative such as methyl cellulose, carboxymethyl cellulose, and hydroxypropyl methyl cellulose. Most preferably the binder of the instant invention comprises polyvinyl alcohol and a polysaccharide. Generally the second composition is known to the skilled addressee as a finishing composition.

The process of the instant invention may be a continuous process or a batch process. Preferably the process of the instant invention is effected in a continuous process seed-treating machine. The machine generally comprises at least three mixing chambers.

In the instant invention, the first and second steps are most preferably effected in a first chamber. These steps are generally followed by a transfer of the seed to a second chamber wherein the third step is effected. Following the third step, another transfer to a third chamber is effected wherein the biological material and/or the phytoprotection product and/or the mixture is/are applied. The chambers used in the apparatus of the instant invention are preferably perforated drums that are generally on an axis and are part of a larger seed treatment apparatus. The mixing chambers of the invention are in relationship, one to another, such that the transfer process of the seed from one chamber to another chamber generally comprises the falling of seed from one chamber into another chamber. The process of the invention most preferably takes place in a series of rotating drums which allows the seeds to fall one on another, thus enhancing the efficiency of the process.

The amount of seed that may be treated by the process of the instant invention is generally in the range of from 20 to 500 kg per minute, preferably from 30 to 200 kg per minute, and most preferably from 40 to 100 kg per minute.

The present invention also relates to a new seed with a coating which comprises:

(a) a first layer which comprises a binder and a particulate solid;

(b) a second layer which comprises a singulating substance;

(c) a third layer which comprises a biological material and/or a phytoprotection product.

Preferably the new seed also comprises:

(d) a fourth layer, which layer contains a binder. The binder preferably comprises polyvinyl alcohol and a polysaccharide.

The layers are laid on the seed in the order of the process of the invention; the binder of the first layer and the particulate solid are defined supra. The singulating substance is defined supra; and the biological material and the phytoprotection product are defined supra.

The following example illustrates the invention. This example is intended only as illustrative and is in no way limitative of the invention.

EXAMPLE 1

A stream of alfalfa seeds at the rate of about 100 kg per minute is fed into a seed treating machine equipped with three perforated rotating drums. In the first drum, a mixture is sprayed on the seed which mixture contains by weight 3% of a binder which comprises polyvinyl alcohol and polysaccharide; 66% limestone powder; 0.5% surfactant; 0.1% dye; 0.1% suspending agent; and 30.3% water. Finely ground silica is added to the drum; after 300 seconds, the seed is transferred to a second drum in which it is dried by a heated air stream for about 300 seconds; after transfer to third drum, a powder containing Rhizobium bacteria is applied to the seed; after 300 seconds, a 3% suspension of the binder is sprayed on the seed and the seed is tumbled and dried for 300 seconds.

While the invention has been described in terms of various preferred embodiments, the person skilled in the art will appreciate that various modifications, substitutions, omissions and changes can be made without departing from the spirit thereof. Accordingly, it is intended that the scope of the present invention be limited solely by the scope of the following claims, including equivalents thereof.

What is claimed is:

1. A process for coating seed which comprises:

(a) in a first step, applying to the seed a wet composition comprising a particulate solid and a binder to produce a wet mixture comprising solid, binder and seeds;

(b) in a second step, contacting the mixture with a singulating substance to produce individually separated seeds each of which is coated with binder, solid and singulating substance; and (c) in a third step, drying the singulated seeds.

2. A process according to claim 1, wherein the singulating substance comprises silicon dioxide.

3. A process according to claim 1, further comprising:

(d) in a fourth step, coating the seeds with a mixture comprising a binder.

4. A process according to claim 2, further comprising:

(d) in a fourth step, coating the seeds with a mixture comprising a binder.

5. A process according to claim 1, which comprises, after the third step, treating the seed with at least one member selected from the group consisting of a biological material and a phytoprotection product.

6. A process according to claim 2, which comprises, after the third step, treating the seed with at least one member selected from the group consisting of a biological material and a phytoprotection product.

7. A process according to claim 3, which comprises, after the third step, treating the seed with at least one member selected from the group consisting of a biological material and a phytoprotection product.

8. A process according to claim 4, which comprises, after the third step, treating the seed with at least one member selected from the group consisting of a biological material and a phytoprotection product.

9. A process according to claim 1, wherein the seed is alfalfa seed.

10. A process according to claim 2, wherein the seed is alfalfa seed.

11. A process according to claim 3, wherein the seed is alfalfa seed.

12. A process according to claim 5, wherein the seed is alfalfa seed.

13. A process according to claim 1, wherein the particulate solid is calcium carbonate.

14. A process according to claim 2, wherein the particulate solid is calcium carbonate.

15. A process according to claim 3, wherein the particulate solid is calcium carbonate.

16. A process according to claim 5, wherein the particulate solid is calcium carbonate.

17. A process according to claim 9, wherein the particulate solid is calcium carbonate.

18. A process according to claim 1, wherein the binder comprises polyvinyl alcohol and a polysaccharide.

19. A process according to claim 2, wherein the binder comprises polyvinyl alcohol and a polysaccharide.

20. A process according to claim 3, wherein the binder comprises polyvinyl alcohol and a polysaccharide.

21. A process according to claim 5, wherein the binder comprises polyvinyl alcohol and a polysaccharide.

22. A process according to claim 9, wherein the binder comprises polyvinyl alcohol and a polysaccharide.

23. A process according to claim 13, wherein the binder comprises polyvinyl alcohol and a polysaccharide.

24. A process according to claim 1, wherein the drying of the seed is effected by an air stream.

25. A process according to claim 24, wherein the air stream is a heated air stream.

26. A process according to claim 5, wherein the biological material comprises bacteria or fungi.

27. A process according to claim 26, wherein the bacteria comprise Rhizobium spp., Azospirillum spp., Beauveria spp. or Pseudomonas spp.

28. A process according to claim 27, wherein the bacteria comprise Rhizobium spp.

29. A process according to claim 26, wherein the fungi comprise Trichoderma spp.

30. A process according to claim 5, wherein the phytoprotection product comprises a fungicide, insecticide, micronutrient, macronutrient or plant growth regulator.

31. A seed with a coating which comprises:
   (a) a first layer which comprises a binder and a particulate solid;
   (b) a second layer which comprises a singulating substance;
   (c) a third layer which comprises at least one member selected from the group consisting of a biological material and a phytoprotection product.

32. A seed according to claim 31, wherein the singulating substance comprises silicon dioxide.

33. A seed according to claim 31, wherein the particulate solid is calcium carbonate.

34. A seed according to claim 31, wherein the binder comprises polyvinyl alcohol and a polysaccharide.

35. A seed according to claim 31, wherein the third layer comprises a biological material.

36. A seed according to claim 35, wherein the biological material comprises bacteria or fungi.

37. A seed according to claim 36, wherein the bacteria comprise Rhizobium spp., Azospirillum spp., Beauveria spp. or Pseudomonas spp.

38. A seed according to claim 37, wherein the bacteria comprise Rhizobium spp.

39. A seed according to claim 31, wherein the singulating substance comprises silicon dioxide, the particulate solid is calcium carbonate, the binder comprises polyvinyl alcohol and a polysaccharide, and the third layer comprises a biological material which comprises Rhizobium bacteria.

40. A seed according to claim 31, wherein the third layer comprises a phytoprotection product.

41. A seed according to claim 40, wherein the phytoprotection product comprises a fungicide, insecticide, micronutrient, macronutrient, or plant growth regulator.

* * * * *